H. ENGEL AND E. FELDMAN.
WINDOW AND WALL CLEANER.
APPLICATION FILED MAR. 19, 1920.
1,352,122.
Patented Sept. 7, 1920.
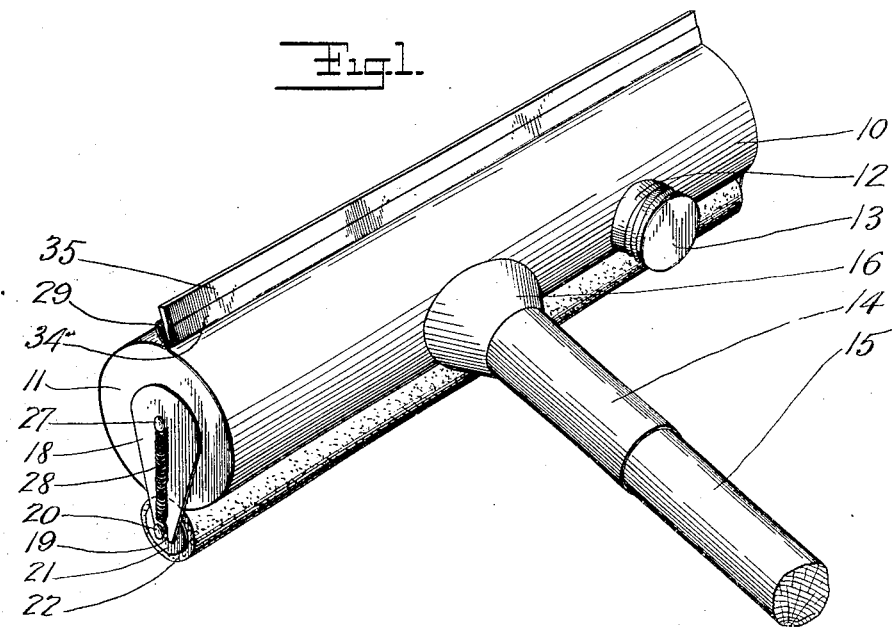
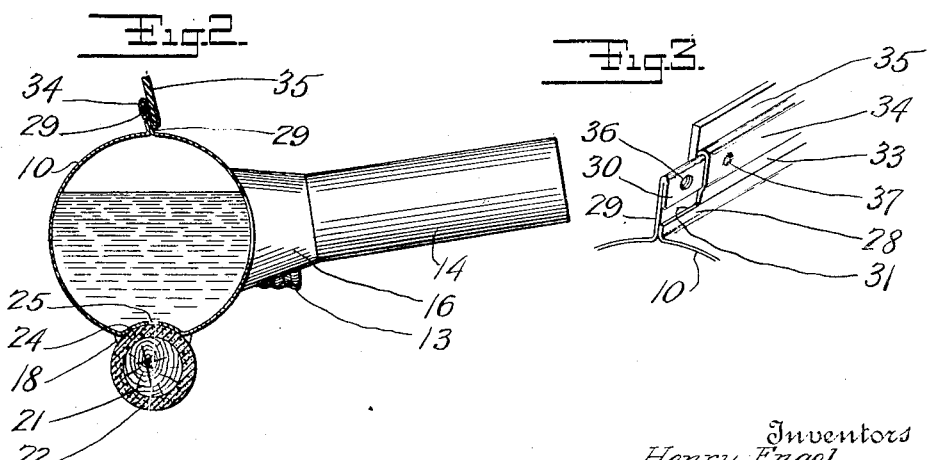
Inventors
Henry Engel
Edward Feldman

UNITED STATES PATENT OFFICE.

HENRY ENGEL AND EDWARD FELDMAN, OF NEW YORK, N. Y.

WINDOW AND WALL CLEANER.

1,352,122.	Specification of Letters Patent.	Patented Sept. 7, 1920.

Application filed March 19, 1920. Serial No. 367,063.

*To all whom it may concern:*

Be it known that we, HENRY ENGEL, a citizen of the United States, residing in New York, county of New York, and State of New York, and EDWARD FELDMAN, a citizen of the United States, residing in New York, county of Bronx, and State of New York, have invented certain new and useful Improvements in Window and Wall Cleaners, of which the following is a specification.

The initial object of this invention is to provide an effective and easily operated implement for cleansing windows, vertical walls, etc., the structure comprising a tank or reservoir for supplying liquid, a rotatable moistening element receptive of the liquid and used as an applicator, so arranged as to present a fresh face as desired, a filling means for the tank and a handle by which the device may be conveniently maneuvered.

A further object is to combine a removably engageable wiper element with the tank, used to dry and polish the level surfaces operated upon.

These and other like objects are attained by the novel construction and combination of parts hereinafter described and shown in the accompanying drawings, forming a material part of this disclosure, and in which:—

Figure 1 is a perspective view of an implement made in accordance with the invention.

Fig. 2 is a transverse sectional view taken through the body portion of the same.

Fig. 3 is a fragmentary perspective view showing the method used in attaching the wiper element.

Referring to the drawings in detail, the numeral 10 designates a tank, here shown as substantially cylindrical, having tight ends 11 and provided with a filling nozzle 12 having a removable cap 13.

A socket or sleeve 14, receptive of the handle 15, which may be of any preferred convenient length, is attached centrally to the tank by its conical base 16 in a secure and permanent manner.

At the ends 11 of the tank are rigidly secured a pair of plate brackets 18, their ends extending beyond the periphery of the tank at an obtuse angle with the socket 14, and contain central slots 19 receptive of the shanks of headed pins 20 set securely central in the ends of a roller 21, covered by a felt cylinder 22 cemented or otherwise secured to it.

This foraminous covered roller, while manually rotatable, is normally held quiescent within a concave arcuate recess 24 extending longitudinally of the tank 10, at its lower side and communicates by a row of perforations 25 with its interior.

Central of the ends 11 are other headed pins 27 and attached to them are the ends of tension springs 28, the other ends of which engage the pins 20, thus drawing the felt covered roller into the recess 24 in such manner as to receive water through the perforations 25, absorbing and conducting the water throughout the roller covering.

Opposite to the recess, the walls of the tank 10 are turned outwardly forming longitudinal flanges 28 and 29, the latter extending to a greater distance and being closely folded upon itself, forming a guide or trackway 30 having a space 31 between its lower edge and the corresponding parallel upper edge of the flange 28.

Slidable in this space is an element 33 formed with a side 34 engageable with the flange elements 29 and 30 in such manner as to permit the slide to be entered at one end and pressed into engagement its entire length, which is substantially equivalent to the length of the tank 10.

Secured to the outer side of the slide 34 is a relative narrow wiper 35, such as a strip of rubber or like material having a smooth edge adapted to pass over a level surface and remove moisture and soft accumulations from it.

In order to maintain the slide 34, when in an adjusted operative position, an opening 36 is formed through the element 30, at a point near its end and engageable therein is a protuberant detent 37, formed in a corresponding location in the slide 34 by indenting the material and normally preventing relative movement.

In operation, the tank having been supplied with water or any preferred cleaning solution, through the capped nozzle 12, and the handle 15 set in its socket, the felt covered roller is applied to the surface to be cleaned in an obvious manner.

The liquid passing through the apertures 25 moistens the roller, which at desired intervals, may be pulled outward, sufficient to permit easily turning the roller to present a fresh face and the operation continued.

The wiper element 35 is positioned by pressing the slide lengthwise into engagement with its trackway or guide until the detent 37 has become engaged, whereupon the implement is reversed and used as a wiper in a well understood manner.

From the foregoing it will be seen that a neat, effective and easily operated appliance for the purpose has been described, of simple and practical character.

Having thus described our invention and set forth the manner of its construction, application and use, what we claim as new and desire to secure by Letters Patent, is:—

1. A cleaning appliance comprising a portable handled tank having a longitudinal concave perforate recess, a felt covered roller, slotted guide brackets engaging said roller to said tank, and springs for drawing said roller into the mentioned recess.

2. A cleaning appliance comprising a cylindrical tank, a filling opening therefor, plate brackets at the ends of said tank, said brackets being slotted at their extending ends, a foraminous roller journaled in the slots of said brackets, said tank having a concave longitudinal depression receptive of the periphery of said roller and containing perforations communicating with the interior of the tank, and tensional means exterior of said brackets adapted to normally seat said roller in the mentioned depression.

3. A cleaning appliance comprising in combination with a manipulative tank and means for applying liquids therefrom, of pair of longitudinal flanges formed with the walls of said tank, one of said flanges being folded upon itself to extend above the other flange forming a trackway, a slide engageable with said trackway, coöperative detents formed with one of the flanges and slide whereby the latter element may be positioned, and a wiper strip carried by said slide.

In testimony whereof we have signed our names to this specification.

HENRY ENGEL.
EDWARD FELDMAN.